(12) United States Patent
Weatherly

(10) Patent No.: US 10,548,297 B2
(45) Date of Patent: Feb. 4, 2020

(54) CANINE TETHERING DEVICE

(71) Applicant: Doss Calvin Weatherly, Wake Forest, NC (US)

(72) Inventor: Doss Calvin Weatherly, Wake Forest, NC (US)

( * ) Notice: Subject to any disclaimer, the term of this patent is extended or adjusted under 35 U.S.C. 154(b) by 128 days.

(21) Appl. No.: 15/956,889

(22) Filed: Apr. 19, 2018

(65) Prior Publication Data
US 2019/0320617 A1    Oct. 24, 2019

(51) Int. Cl.
*A01K 27/00* (2006.01)
*E01H 1/12* (2006.01)

(52) U.S. Cl.
CPC .......... *A01K 27/004* (2013.01); *A01K 27/006* (2013.01); *A01K 27/007* (2013.01); *A01K 27/008* (2013.01); *E01H 1/1206* (2013.01); *E01H 2001/128* (2013.01); *E01H 2001/1266* (2013.01); *E01H 2001/1273* (2013.01)

(58) Field of Classification Search
CPC ... A01K 27/006; A01K 27/004; A01K 27/008
See application file for complete search history.

(56) References Cited

U.S. PATENT DOCUMENTS

| | | | |
|---|---|---|---|
| 4,146,260 A | 3/1979 | Carrington | |
| D369,444 S | 4/1996 | Ubdegrove | |
| 7,523,972 B1 * | 4/2009 | Wawrzynowski | E01H 1/1206 294/1.3 |
| 7,695,035 B2 | 4/2010 | Sumner | |
| 7,992,907 B1 | 8/2011 | De Jesus | |
| 8,100,445 B1 * | 1/2012 | Brar | A01K 27/004 119/796 |
| 8,925,495 B1 * | 1/2015 | Lee | E01H 1/1206 119/161 |
| 9,155,287 B2 | 10/2015 | Messner | |
| D762,018 S | 7/2016 | Schmidt | |
| 9,783,943 B2 * | 10/2017 | Llobet | E01H 1/1206 |
| 10,370,809 B1 * | 8/2019 | Samen | A01K 27/006 |
| 2010/0206246 A1 | 8/2010 | Waldrep | |
| 2012/0186539 A1 * | 7/2012 | Johnston | A01K 27/004 119/796 |
| 2015/0196010 A1 * | 7/2015 | Orubor | A01K 27/004 119/72 |

FOREIGN PATENT DOCUMENTS

WO    WO2005100695    10/2005

* cited by examiner

*Primary Examiner* — Monica L Williams

(57) ABSTRACT

A canine tethering device for walking a dog includes a leash that is coupled to an upper end of a frame. An umbrella, a flashlight, and a pouch are coupled to the frame. A sprayer that comprises capsaicin and propellent is coupled to the leash. The sprayer is configured to selectively aerosolize the capsaicin. Waste bags are sequentially extractable, through a hole that is positioned in the pouch, from a roll that is positioned in the pouch. A pair of jaws is pivotally coupled to a lower end of the frame. An actuator is coupled to the frame proximate to the upper end. The actuator is operationally coupled to the jaws. The actuator is positioned to pivot the jaws to an open configuration to insert dog waste between the jaws and to pivot the jaws to a closed configuration to collect the dog waste.

14 Claims, 2 Drawing Sheets

CANINE TETHERING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to tethering devices and more particularly pertains to a new tethering device for walking a dog.

BRIEF SUMMARY OF THE INVENTION

An embodiment of the disclosure meets the needs presented above by generally comprising a leash that is coupled to an upper end of a frame. An umbrella, a flashlight, and a pouch are coupled to the frame. A sprayer that comprises capsaicin and propellent is coupled to the leash. The sprayer is configured to selectively aerosolize the capsaicin. Waste bags are sequentially extractable, through a hole that is positioned in the pouch, from a roll that is positioned in the pouch. A pair of jaws is pivotally coupled to a lower end of the frame. An actuator is coupled to the frame proximate to the upper end. The actuator is operationally coupled to the jaws. The actuator is positioned to pivot the jaws to an open configuration to insert dog waste between the jaws and to pivot the jaws to a closed configuration to collect the dog waste.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
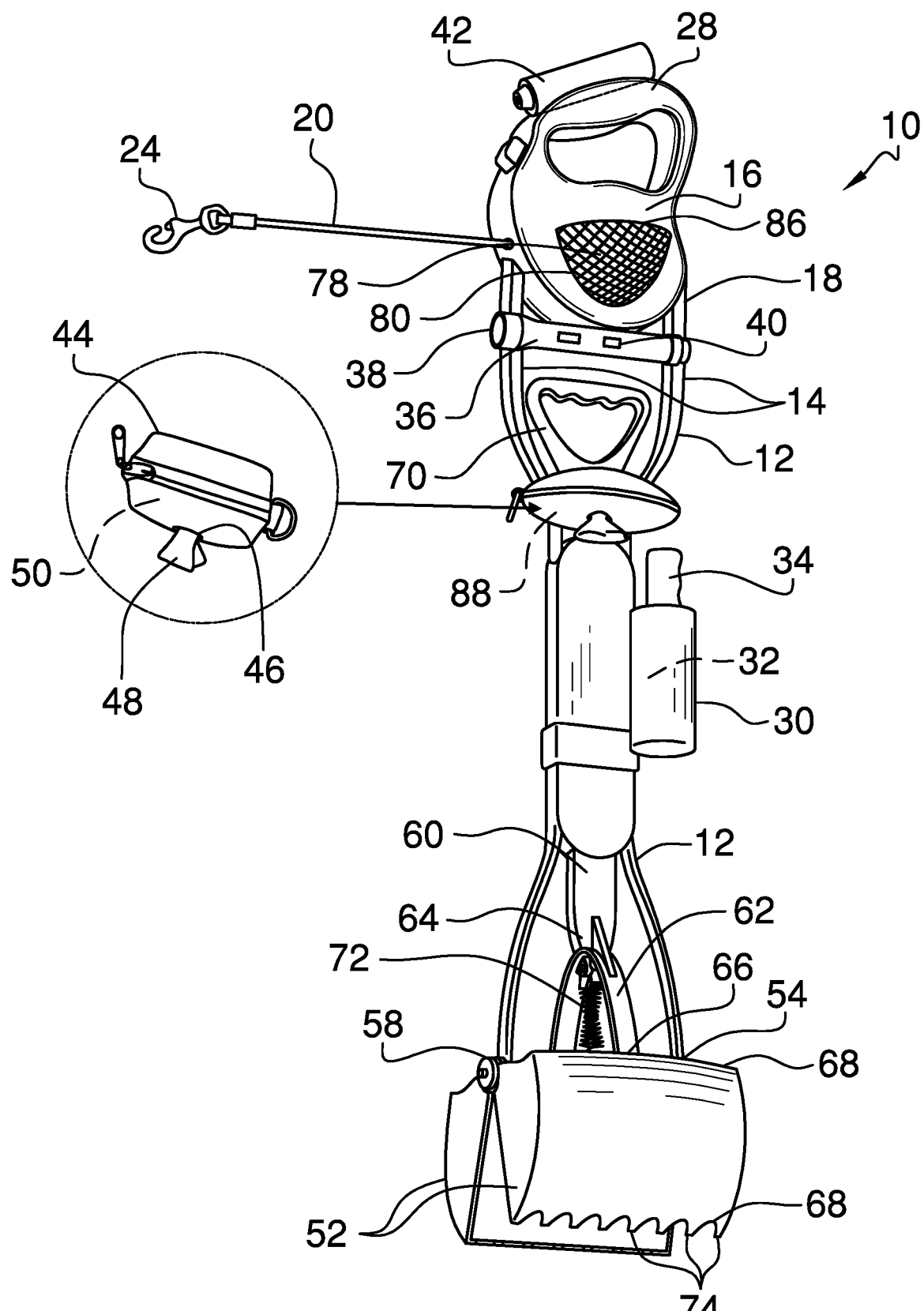
FIG. 1 is an isometric perspective view of a canine tethering device according to an embodiment of the disclosure.
Figure 2:
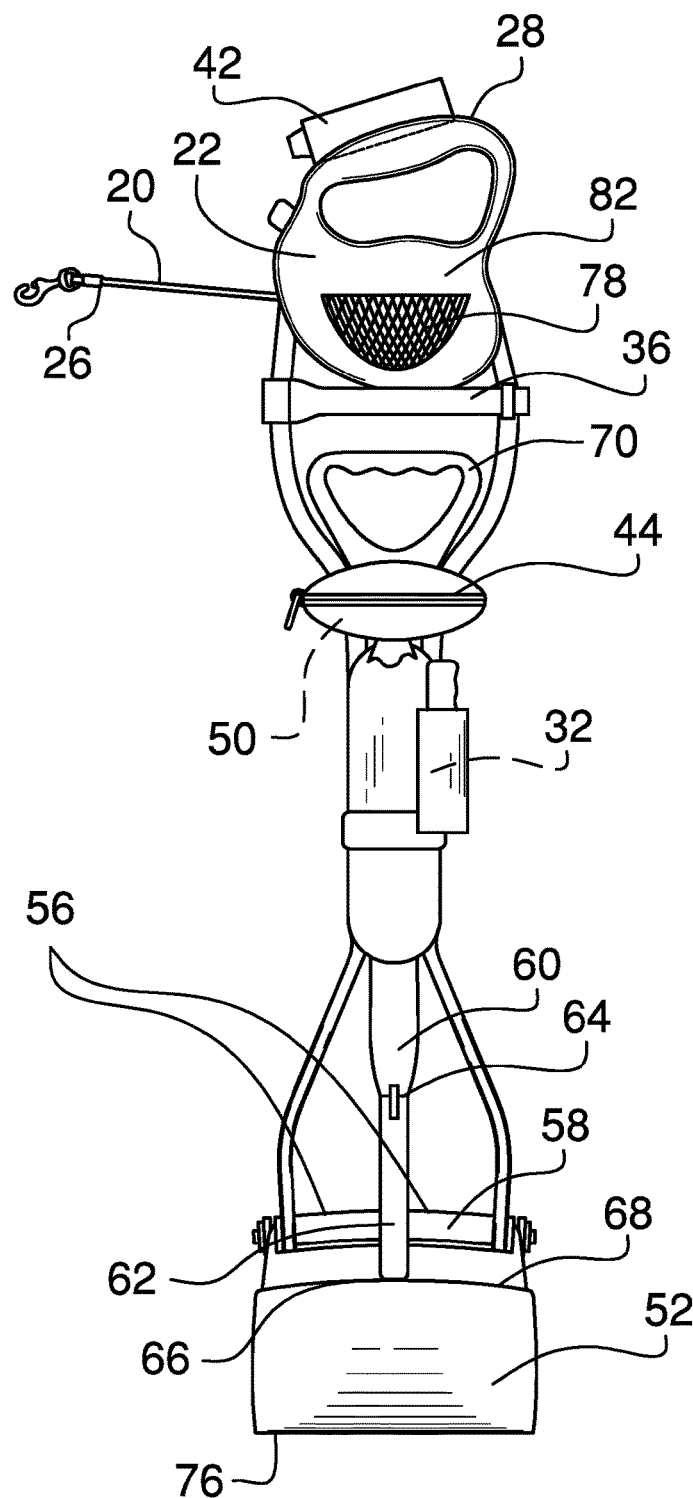
FIG. 2 is a front view of an embodiment of the disclosure.
Figure 3:
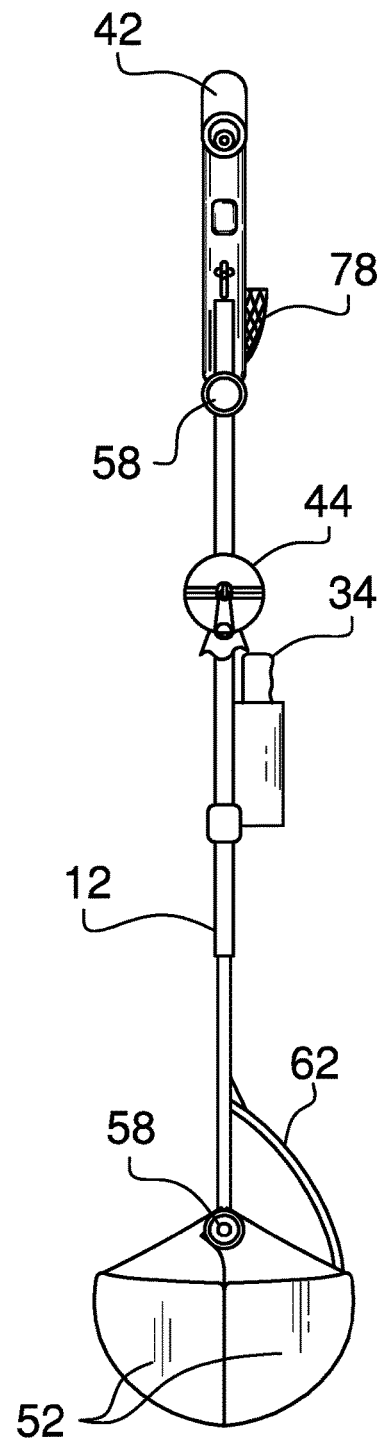
FIG. 3 is a side view of an embodiment of the disclosure.

With reference now to the drawings, and in particular to FIGS. 1 through 3 thereof, a new tethering device embodying the principles and concepts of an embodiment of the disclosure and generally designated by the reference numeral 10 will be described.

As best illustrated in FIGS. 1 through 3, the canine tethering device 10 generally comprises a frame 12. The frame 12 comprises a pair of rods 14. The rods 14 are recurved so that the frame 12 is elongated hourglass shaped. A leash 16 is coupled to an upper end 18 of the frame 12. The leash 16 is retractable type and comprises components well known to those skilled in the art. A cord 20 of the leash 16 is selectively extensible from a housing 22 of the leash 16. The cord 20 is reflective. The cord 20 comprises phosphorescent pigment so that the cord 20 is phosphorescent.

A snap hook 24 is coupled to an endpoint 26 of the cord 20 distal from the housing 22. The snap hook 24 is configured to couple to a collar that is positioned on a dog to couple the dog to the leash 16.

A grip 28 is coupled to the leash 16. The grip 28 is opposingly positioned relative to the frame 12. The grip 28 is configured to be grasped in a hand of a user to lift the frame 12.

A tube 30 is coupled to the frame 12. The tube 30 is open-topped and closed-bottomed. The tube 30 is circularly shaped when viewed longitudinally. An umbrella 32, which is collapsible, is configured to be collapsed and to be inserted into the tube 30 to couple the umbrella 32 to the frame 12. An umbrella handle 34 protrudes from the tube 30, as shown in FIG. 1. The umbrella handle 34 is configured to be grasped in the hand of the user to extract the umbrella 32 from the tube 30 and to support the umbrella 32 above the user to shield the user from inclement weather.

A flashlight 36 is coupled to the frame 12 proximate to the upper end 18. The flashlight 36 is coupled to and extends between the rods 14 proximate to the upper end 18 of the frame 12 such that a bezel 38 of the flashlight 36 protrudes from the frame 12 and such that a switch 40 of the flashlight 36 is positioned proximate to the leash 16, as shown in FIG. 1. The flashlight 36 is configured to selectively illuminate an area proximate to the user.

A sprayer 42 is coupled to the leash 16. The sprayer 42 is positioned on the grip 28 so that the sprayer 42 is opposingly positioned on the grip 28 relative to the leash 16.

The sprayer 42 comprises capsaicin and propellent. The sprayer 42 is configured to selectively aerosolize the capsaicin to protect the user and the dog that is coupled to the leash 16 from attack, as the capsaicin is an effective deterrent for use against humans and animals, such as an aggressive dog. The sprayer 42 is positioned proximate to the hand of the user to facilitate rapid deployment when required.

A pouch 44 is coupled to the frame 12 proximate to the upper end 18. A hole 46 is positioned in the pouch 44. The hole 46 is positioned to allow sequential extraction of waste bags 48 from a roll of waste bags 50 that is positioned in the pouch 44.

A pair of jaws 52 pivotally is coupled to a lower end 54 of the frame 12. An actuator 56 is coupled to the frame 12 proximate to the upper end 18. The actuator 56 is operationally coupled to the jaws 52. The actuator 56 is positioned to pivot the jaws 52 to an open configuration, as shown in FIG. 1, to insert dog waste between the jaws 52. The actuator 56 also is positioned to pivot the jaws 52 to a closed configuration, as shown in FIG. 3, to collect the dog waste. The user also may position a waste bag 48 around the jaws 52 with the jaws 52 in the open configuration. The dog waste then is inserted between the jaws 52. The actuator 56 pivots the jaws 52 to the closed configuration to collect the dog waste within the waste bag 48 so that the user avoids contact with the dog waste.

The actuator 56 comprises an axle 58 that is rotationally coupled to and extends between pair of rods 14. The pair of jaws 52 is coupled to the axle 58 so that the pair of jaws 52 is pivotable relative to the frame 12. A bar 60 is slidably coupled to and is positioned between the pair of rods 14. A flat spring 62 is coupled to a lower terminus 64 of the bar 60. Each of opposing ends 66 of the flat spring 62 is coupled to an upper edge 68 of a respective jaw 52 so that the pair of jaws 52 is biased to the open configuration.

An actuator handle 70 is coupled to an upper terminus 88 of the bar 60. The actuator handle 70 is configured to be grasped in a hand of the user to slide the bar 60 upwardly relative to the frame 12 to urge the pair of jaws 52 from the open configuration to the closed configuration to collect the dog waste.

Each of a pair of springs 72 is coupled to and extends between the lower terminus 64 of the bar and the axle 58. The springs 72 are configured to be tensioned as the bar 60 is slid upwardly relative to the frame 12. The springs 72 also are configured to rebound when the actuator handle 70 is released to slide the bar 60 downwardly relative to the frame 12. The pair of jaws 52 is urged from the closed configuration to the open configuration to release the dog waste.

A set of teeth 74 is coupled to and extends from a lower edge 76 of a respective jaw 52. The teeth are configured to facilitate placement of the respective jaw 52 between the dog waste and a surface upon which the dog waste is positioned.

Each of a pair of panels 78 is coupled by a lower perimeter 80 to a respective opposing side 82 of the leash 16. An upper perimeter 84 of the panel 78 and the respective opposing side 82 of the leash 16 define an opening 86. The panels 78 are resilient and meshed. Each panel 78 is configured to retain a respective item of the user that is positioned between the panel 78 and the leash 16 by insertion through the opening 86.

In use, the snap hook 24 is configured to couple to the collar that is positioned on the dog to couple the dog to the leash 16. The hole 46 that is positioned in the pouch 44 is positioned to allow sequential extraction of the waste bags 48 from the roll of waste bags 50 that is positioned in the pouch 44. The actuator handle 70 is configured to be grasped in a hand of the user to slide the bar 60 upwardly relative to the frame 12 to urge the pair of jaws 52 from the open configuration to the closed configuration to collect the dog waste. The springs 72 are configured to rebound when the actuator handle 70 is released to slide the bar 60 downwardly relative to the frame 12. The pair of jaws 52 is urged from the closed configuration to the open configuration to release the dog waste. The umbrella 32 is configured to be collapsed to be inserted into the tube 30 to couple the umbrella 32 to the frame 12. The flashlight 36 is configured to selectively illuminate the area proximate to the user. The sprayer 42 is configured to selectively aerosolize the capsaicin to protect the user and the dog that is coupled to the leash 16 from attack.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A canine tethering device comprising:
a frame;
a leash coupled to an upper end of said frame;
a tube coupled to said frame, said tube being open-topped and closed-bottomed;
an umbrella, said umbrella being collapsible wherein said umbrella is configured for collapsing for inserting into said tube for coupling said umbrella to said frame;
a flashlight coupled to said frame proximate to said upper end wherein said flashlight is configured for selectively illuminating an area proximate to a user;
a sprayer coupled to said leash, said sprayer comprising capsaicin and propellent wherein said sprayer is configured for selectively aerosolizing the capsaicin;
a pouch coupled to said frame proximate to said upper end;
a hole positioned in said pouch wherein said hole is positioned for sequentially extracting waste bags from a roll of waste bags positioned in said pouch;
a pair of jaws pivotally coupled to a lower end of said frame; and
an actuator coupled to said frame proximate to said upper end, said actuator being operationally coupled to said jaws such that said actuator is positioned for pivoting said jaws to an open configuration inserting dog waste between said jaws and for pivoting said jaws to a closed configuration for collecting the dog waste.

2. The device of claim 1, further including said frame comprising a pair of rods, said rods being recurved such that said frame is elongated hourglass shaped.

3. The device of claim 2, further including said flashlight being coupled to and extending between said rods proximate to said upper end of said frame such that a bezel of said flashlight protrudes from said frame and such that a switch of said flashlight is positioned proximate to said leash.

4. The device of claim 2, further including said actuator comprising:
an axle rotationally coupled to and extending between pair of rods, said pair of jaws being coupled to said axle such that said pair of jaws is pivotable relative to said frame;
a bar slidably coupled to and positioned between said pair of rods;
a flat spring coupled to a lower terminus of said bar, said flat spring having opposing ends, each said opposing end being coupled to an upper edge of a respective said jaw such that said pair of jaws is biased to the open configuration;
an actuator handle coupled to an upper terminus of said bar wherein said actuator handle is configured for grasping in a hand of the user for sliding said bar upwardly relative to said frame for urging said pair of jaws from the open configuration to the closed configuration for collecting the dog waste; and
a pair of springs, each said spring being coupled to and extending between said lower terminus of said bar and said axle wherein said springs are configured for tensioning as said bar is slid upwardly relative to said frame and for rebounding when said actuator handle is released for sliding said bar downwardly relative to said frame for urging said pair of jaws from the closed configuration to the open configuration for releasing the dog waste.

5. The device of claim 1, further including said leash being retractable type wherein a cord of said leash is selectively extensible from a housing of said leash.

6. The device of claim 5, further including said cord being reflective.

7. The device of claim 5, further including said cord comprising phosphorescent pigment such that said cord is phosphorescent.

8. The device of claim 5, further including a snap hook coupled to an endpoint of said cord distal from said housing wherein said snap hook is configured for coupling to a collar positioned on a dog for coupling the dog to said leash.

9. The device of claim 1, further including a grip coupled to said leash, said grip being opposingly positioned relative to said frame such that said grip is configured for grasping in a hand of the user for lifting said frame.

10. The device of claim 9, further including said sprayer being positioned on said grip such that said sprayer is opposingly positioned on said grip relative to said leash wherein said sprayer is positioned proximate to the hand of the user.

11. The device of claim 1, further including said tube being circularly shaped when viewed longitudinally.

12. The device of claim 1, further including a set of teeth, said set of teeth being coupled to and extending from a lower edge of a respective said jaw wherein said teeth are configured for facilitating placement of said respective said jaw between the dog waste and a surface upon which the dog waste is positioned.

13. The device of claim 1, further including a pair of panels, each said panel being coupled by a lower perimeter to a respective opposing side of said leash such that an upper perimeter of said panel and said respective said opposing side of said leash define an opening, said panels being resilient and meshed wherein each said panel is configured for retaining a respective item of the user positioned between said panel and said leash by inserting through said opening.

14. A canine tethering device comprising:
a frame, said frame comprising a pair of rods, said rods being recurved such that said frame is elongated hourglass shaped;
a leash coupled to an upper end of said frame, said leash being retractable type wherein a cord of said leash is selectively extensible from a housing of said leash, said cord being reflective, said cord comprising phosphorescent pigment such that said cord is phosphorescent;
a snap hook coupled to an endpoint of said cord distal from said housing wherein said snap hook is configured for coupling to a collar positioned on a dog for coupling the dog to said leash;
a grip coupled to said leash, said grip being opposingly positioned relative to said frame such that said grip is configured for grasping in a hand of a user for lifting said frame;
a tube coupled to said frame, said tube being open-topped and closed-bottomed, said tube being circularly shaped when viewed longitudinally;
an umbrella, said umbrella being collapsible wherein said umbrella is configured for collapsing for inserting into said tube for coupling said umbrella to said frame such that an umbrella handle protrudes from said tube wherein said umbrella handle is configured for grasping in the hand of the user for extracting said umbrella from said tube and for supporting said umbrella above the user for shielding the user from inclement weather;
a flashlight coupled to said frame proximate to said upper end wherein said flashlight is configured for selectively illuminating an area proximate to the user, said flashlight being coupled to and extending between said rods proximate to said upper end of said frame such that a bezel of said flashlight protrudes from said frame and such that a switch of said flashlight is positioned proximate to said leash;
a sprayer coupled to said leash, said sprayer comprising capsaicin and propellent wherein said sprayer is configured for selectively aerosolizing the capsaicin;
a pouch coupled to said frame proximate to said upper end;
a hole positioned in said pouch wherein said hole is positioned for sequentially extracting waste bags from a roll of waste bags positioned in said pouch;
a pair of jaws pivotally coupled to a lower end of said frame;
an actuator coupled to said frame proximate to said upper end, said actuator being operationally coupled to said jaws such that said actuator is positioned for pivoting said jaws to an open configuration inserting dog waste between said jaws and for pivoting said jaws to a closed configuration for collecting the dog waste, said actuator comprising:
an axle rotationally coupled to and extending between pair of rods, said pair of jaws being coupled to said axle such that said pair of jaws is pivotable relative to said frame,
a bar slidably coupled to and positioned between said pair of rods, a flat spring coupled to a lower terminus of said bar, said flat spring having opposing ends, each said opposing end being coupled to an upper edge of a respective said jaw such that said pair of jaws is biased to the open configuration, an actuator handle coupled to an upper terminus of said bar wherein said actuator handle is configured for grasping in a hand of the user for sliding said bar upwardly relative to said frame for urging said pair of jaws from the open configuration to the closed configuration for collecting the dog waste, and a pair of springs, each said spring being coupled to and extending between said lower terminus of said bar and said axle wherein said springs are configured for tensioning as said bar is slid upwardly relative to said frame and for rebounding when said actuator handle is released for sliding said bar downwardly relative to said frame for urging said pair of jaws from the closed configuration to the open configuration for releasing the dog waste;

a set of teeth, said set of teeth being coupled to and extending from a lower edge of a respective said jaw wherein said teeth are configured for facilitating placement of said respective said jaw between the dog waste and a surface upon which the dog waste is positioned; and a pair of panels, each said panel being coupled by a lower perimeter to a respective opposing side of said leash such that an upper perimeter of said panel and said respective said opposing side of said leash define an opening, said panels being resilient and meshed wherein each said panel is configured for retaining a respective item of the user positioned between said panel and said leash by inserting through said opening.

\* \* \* \* \*